Patented Dec. 27, 1949

2,492,732

UNITED STATES PATENT OFFICE 2,492,732

COPPER PHTHALOCYANINE DYESTUFF

Armin Bucher, Basel, Switzerland, assignor to Ciba Limited, a Swiss firm

No Drawing. Application May 3, 1948, Serial No. 24,915. In Switzerland May 7, 1947

1 Claim. (Cl. 260—314.5)

It is known thtat ortho-dicyano-aryls can be condensed with one another to form strongly colored products which are relatively complicated compounds and are generally grouped together under the class name "phthalocyanines." As a rule the condensation is facilitated by conducting the reaction in the presence of a metal which is capable of forming complexes and can enter into complex union simultaneously with the formation of the phthalocyanine.

It is also known that the same phthalocyanines can be obtained in some cases by using, instead of ortho-dicyano-aryls, the corresponding ortho-dicarboxylic acids or their anhydrides or other functional derivatives of the appropriate ortho-dicarboxylic acids. In this case it is generally necessary to have present during the reaction a compound which is capable of yielding the requisite nitrogen. As compounds yielding nitrogen there come into consideration more especially urea and derivatives thereof. In all these reactions there may be added, as desired, a substance having a catalytic action such as ammonium molybdate, or a diluent or fluxing agent, especially one of high boiling point such as nitrobenzene, chloronaphthalene or di- or tri-chlorobenzene.

It is also known that in certain especially simple cases ortho-dihalogen-aryls may be used, instead of ortho-dicyano-aryls or aryl-ortho-dicarboxylic acids or their functional derivatives, provided that care is taken to form the corresponding dicyano-aryls in the reaction medium, for example by the addition of cuprous cyanide.

According to present knowledge the phthalocyanines are assumed to possess a —(C=N)₈— ring and four aromatic rings directly attached to the said —(C=N)₈— ring (see the formulae in the examples) and the present invention will be formulated in accordance with this theory.

According to the present invention valuable new copper phthalocyanines are made by using as starting material a compound of the general formula

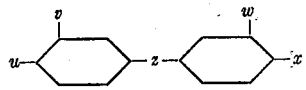

in which $z$ represents the residue of a dibasic acid containing only one central atom, and $u$, $v$, $w$ and $x$ each represents a carboxyl group or a functional derivative thereof including a cyano-group.

In the starting materials of the above formula $x$ may, for example, represent the residue of a simple dibasic acid such as carbonic acid or sulfuric acid; in other words the group —CO— or —SO₂—. There may be mentioned more especially the following starting materials: 3:3':4:4'-tetracyano - benzophenone, 4:4'-dicyano-benzophenone-3:3'-dicarboxylic acid and 4-cyano-diphenyl-sulfone-3:3':4'-tricarboxylic acid.

The reaction of these starting materials to form the corresponding phthalocyanines, especially metalliferous phthalo-cyanines, for example, copper phthalocyanines, may be carried out by methods in themselves known, the tetracyano-compounds being simply heated with a cuprous halide, for example, cuprous chloride, if desired, with the addition of a small quantity of a substance of alkaline reaction, such as sodium hydroxide, in a high boiling solvent such as nitrobenzene, and compounds containing carboxyl groups in addition to cyano groups being advantageously fused with urea, if desired, with the addition of an agent having a catalytic action such as ammonium molybdate and a copper compound.

The present invention also enables dyestuffs of the phthalocyanine type to be made, which are to be regarded as mixed complexes, by condensing the starting materials above described with the usual ortho-dicyano-aryls or aryl-ortho-dicarboxylic acids or functional derivatives thereof. As ortho-dicyano-aryls there come into consideration especially phthalonitrile and its substitution products, while as aryl-ortho-dicarboxylic acids there may be mentioned phthalic acid or phthalic anhydride or its substitution products, for example, tetra-chlorophthalic anhydride. In many cases it is of advantage to use 1 mol of a starting material of the kind described above and 6 mols of a simple ortho-dicyano-aryl or an aryl-ortho-dicarboxylic acid. The properties of the products so obtained make it probable that there is formed in the reaction a dyestuff of phthalocyanine type in which 2 molecules of a normal phthalocyanine are connected together by the grouping $x$.

Under conditions of temperature and concentration leading to the sulfonation of the normal copper phthalocyanine molecule, a mixture containing the normal molecule would be partially sulfonated, whereas experiment shows that more intense conditions are required for sulfonating the "mixed condensation" products.

In the above mentioned mixed condensation it is of advantage to choose the starting materials so that they contain cyano groups throughout or contain throughout carboxyl groups, if desired, in addition to cyano groups. Thus, for example, 1 mol of tetracyano-benzophenone may be combined with 6 mols of phthalonitrile or 1 mol of one of the above named di- or tri-carboxylic acids with 6 mols of phthalic anhydride.

The resulting dyestuffs are valuable pigments which can be pulverized and purified in the usual manner. The crude products are advantageously subjected to a pasting treatment, for example, by being taken up in concentrated sulfuric acid and reprecipitated by the introduction of water. The present process yields, among others, dyestuffs which possess the known good properties of phthalocyanines, but of which the tints are shifted towards green.

The dyestuffs of the present invention appear to be copper phthalocyanine dyestuffs whose aromatic rings are of the benzene series and wherein at least two benzene rings directly attached to the —(C=N)₈— ring typical for phthalocyanines are interconnected by a radical of a dibasic acid containing only one central atom, e. g. an —SO₂— group or preferably a —CO— group. In the "mixed" type of dyestuffs apparently the two interconnected benzene rings are attached to two different —(C=N)₈— rings.

The invention also includes the treatment of the dyestuffs obtained with oleum at a raised temperature, for example, at 100° C., to convert them into the corresponding sulfonic acids. In this form they can be used for the substantive dyeing of cellulose fibers or for dyeing anodically oxidized aluminium.

The invention also includes the treatment in known manner of the phthalocyanines of the new process with halogenating agents, such as chlorine and especially bromine. As compared with the dyestuffs obtained by after-brominating the known copper phthalocyanines, the after-brominated phthalocyanines of the same bromine content obtained by the present invention yield substantially more greenish tints.

German Patent No. 747,779 describes inter alia the treatment of 3:3′:4:4′-tetrachlorobenzophenone with cuprous cyanide and cuprous bromide in quinoline. However, by the known process a dyestuff is obtained which is soluble in pyridine to give a blue-green coloration, and is, therefore, fundamentally different from the corresponding dyestuff obtained by the present process from 3:3′:4:4′ - tetracyanobenzophenone or 4:4′-dicyanobenzophenone-3:3′-dicarboxylic acid.

The following examples illustrate the invention, the parts being by weight:

Example 1

4.6 parts of 3:3′:4:4′-tetracyanobenzophenone are heated in 120 parts of nitrobenzene while stirring at 80° C., 1 part of cuprous chloride and 0.05 part of solid sodium hydroxide are then added, and the whole is heated to 200–210° C. and stirred for 15 hours at that temperature. The whole is then allowed to cool, filtered with suction to separate the dyestuff, and the dyestuff is extracted by boiling first with dilute hydrochloric acid, then with dilute caustic soda solution and finally with alcohol. The black powder so obtained is practically insoluble in organic solvents. By taking it up in concentrated sulfuric acid a green solution is obtained, which when poured into water yields a blue-green dyestuff. The latter produces bluish green coatings, and corresponds to the formula

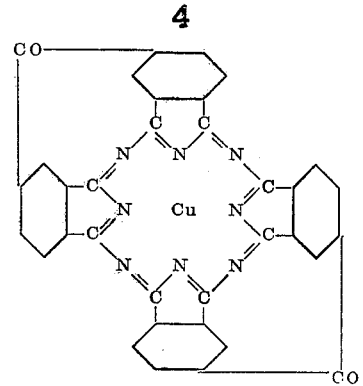

By heating the dyestuff so obtained in oleum of 25 per cent. strength for 2 hours at 160° C. a sulfonation product is obtained which dyes cotton pale green tints.

The 3:3′:4:4′-tetracyanobenzophenone used in this example may be obtained by tetrazotizing 4:4′ - diamino-benzophenone - 3:3′ - dicarboxylic acid, converting the tetrazo-compound by means of cuprous cyanide into the corresponding 4:4′-dicyanobenzophenone - 3:3′ - dicarboxylic acid, forming the ammonium salt of the latter, and treating the ammonium salt with phosphorus oxychloride in pyridine to split off water and yield 3:3′:4:4′ - tetracyanobenzophenone. The latter compound, when recrystallized from trichlorobenzene, yields colorless crystals which melt between 239° C. and 242° C. while becoming greener in color.

Example 2

10 parts of 4:4′-dicyanobenzophenone-3:3′-dicarboxylic acid are heated with 40 parts of urea and 0.1 part of ammonium molybdate at 180° C. A small quantity of highly sulfonated Turkey red oil is then added to check foaming, 2.5 parts of cupric chloride are added, and the whole is stirred at about 210° C., for 3 hours. The melt is allowed to cool, and is pulverized after solidification. It is then extracted by boiling with dilute hydrochloric acid, then with dilute caustic soda solution, and finally with alcohol. A black powder is obtained which is practically identical with the crude product of Example 1 and may be worked up in the manner described in that example.

Example 3

2.1 parts of 3:3′:4:4′-tetracyanobenzophenone and 4.8 parts of phthalonitrile are heated with 80 parts of nitrobenzene, while stirring, to 180° C. 1.4 parts of cuprous chloride are then added and the whole is stirred for 16 hours at 200–210° C. The resulting dyestuff is separated by filtration, and extracted by boiling with dilute hydrochloric acid, then with dilute caustic soda solution and finally with alcohol. The dyestuff which corresponds to the formula

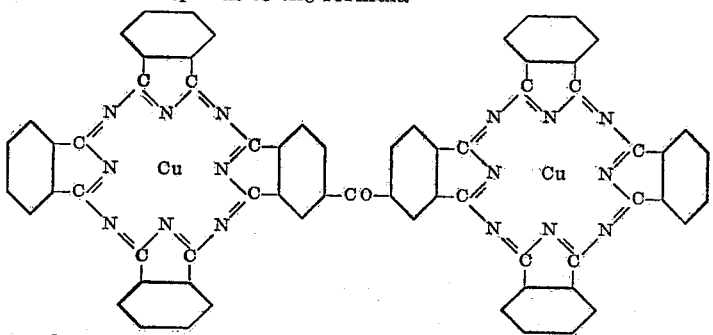

is a greenish blue powder which is insoluble in organic solvents. It dissolves in concentrated sulfuric acid with a green coloration. When the solution is poured into water a greenish blue pigment is precipitated, which gives coatings on paper similar in color to that of the metal-free phthalocyanine free from substituents. The appended claim is directed to the dyestuff of the preceding formula.

The dyestuff can be sulfonated by treatment with oleum of 20 per cent. strength at 130° C. in about 30 minutes, and it then dyes cotton greenish blue tints.

By treating the dyestuff with bromine or sulfuryl chloride in an inert medium there are obtained, depending on the conditions used, dyestuffs with a lower or higher content of halogen (for example, up to about 49 per cent. of bromine), which give shades which are shifted towards green as the halogen content increases.

*Example 4*

4 parts of 4:4'-dicyanobenzophenone-3:3'-dicarboxylic acid are heated, while stirring, to 170–180° C. with 11 parts of phthalic anhydride, 40 parts of urea and 0.1 part of ammonium molybdate. There are then added 4.3 parts of cupric chloride and, if the melt foams strongly, a few parts of highly sulfonated Turkey red oil. The whole is stirred for about 3–4 hours at 190–200° C. until the melt has become solid. It is then allowed to cool, and the product is pulverized and extracted by boiling with dilute hydrochloric acid, dilute caustic soda solution and finally with alcohol. A dyestuff is obtained which is practically identical with the dyestuff of Example 3.

*Example 5*

3.2 parts of 4:4'-dicyanobenzophenone-3:3'-dicarboxylic acid, 17 parts of tetrachlorophthalic anhydride, 40 parts of urea and 0.1 part of ammonium molybdate are heated at 170–180° C., while stirring. 4.3 parts of cupric chloride are added, and the procedure described in Example 4 is then followed. There is obtained a dark green powder which is insoluble in organic solvents and dissolves with a dark green coloration in concentrated sulfuric acid. It is precipitated by means of water in the form of a dark green pigment which yields dull green coatings.

*Example 6*

15 parts of 4-cyano-diphenyl-sulfone-3:3':4'-tricarboxylic acid (in the form of a honey-like product, see below) are heated with 39 parts of urea in an oil bath at 180° C. 0.09 part of ammonium molybdate and 2.5 parts of anhydrous cupric chloride are added while thoroughly stirring, to the resulting melt, and if desired a small quantity of highly sulfonated Turkey red oil is added. The whole is heated up to 235–240° C. and the mixture is maintained at this temperature for about 5 hours, until the mass has become solid. The product so obtained is then pulverized, and extracted by boiling with dilute hydrochloric acid, dilute caustic soda solution and aqueous alcohol of about 70 per cent. strength. An almost black powder which corresponds to the formula

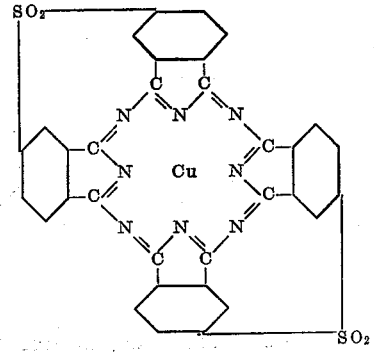

is obtained which yields bluish green coatings after reprecipitation from concentrated sulfuric acid. The dyestuff may be converted into a sulfonation product by treatment with oleum of 21 per cent. strength at 160° C. for about 15 minutes. The sulfonation product dyes cotton bluish green tints.

The 4-cyano-diphenylsulfone-3:3':4'-tricarboxylic acid used in this example may be prepared in the following manner:

31 parts of benzene-3:4-dicarboxylic acid-1-sulfinic acid are dissolved in 50 parts of freshly distilled amyl alcohol, and the whole is added to a solution of 16.2 parts of 2-cyano-5-chlorobenzoic acid in 225 parts of amyl alcohol. While the whole is powerfully stirred at 80–90° C., 0.45 part of very finely divided copper and 32.4 parts of anhydrous potassium carbonate are added, and the whole is then heated with constant stirring in an oil bath maintained at 145° C. The whole is cooled, caustic soda solution is added until the reaction is distinctily alkaline and the amyl alcohol is expelled with steam. A large quantity of the water contained in the residual solution is evaporated. It is then acidified with concentrated hydrochloric acid, and the product so obtained is extracted with ether. After removing the ether by distillation, 4-cyano-diphenylsulfone-3:3':4'-tricarboxylic acid remains behind in the form of a yellow, honey-like product.

*Example 7*

6 parts of 4-cyano-diphenyl-sulfone-3:3':4'-tricarboxylic acid and 8 parts of phthalic anhydride are heated with 60 parts of urea to 180° C. At this temperature 0.15 part of ammonium molybdate and 3 parts of anhydrous cupric chloride are added, while thoroughly stirring, and the whole is heated at 200–210° C. for 5 hours with the addition of a small quantity of highly sulfonated Turkey red oil. The cooled melt is pulverized, and extracted by boiling as described in Example 6 and dried. An almost black powder which corresponds to the formula

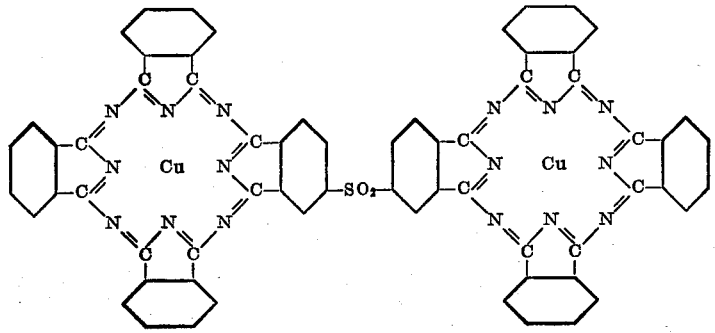

is obtained which yields greenish-blue coatings after reprecipitation from concentrated sulfuric acid.

The product so obtained may be sulfonated by treatment with oleum of 21 per cent. strength at 99° C. for 2 hours. It then dyes cotton blue tints, which are slightly more greenish than those obtained with the usual sulfonated copper phthalocyanine.

It is to be understood that the distribution of double and single bonds in the $-(C=N)_8-$ ring is not established according to the present knowledge and there is ample possibility for tautomeric shift of bonds including the formation of quinoidic benzene rings, direct Cu—N links instead of only coordinative bonds, etc.

What I claim is:
The copper phthalocyanine dyestuff of the formula

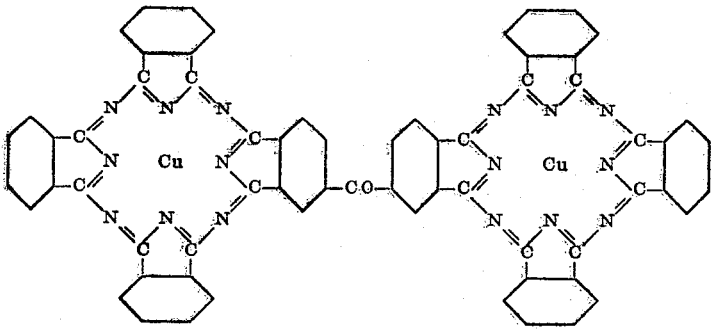

ARMIN BUCHER.

REFERENCES CITED

The following references are of record in the file of this patent:

UNITED STATES PATENTS

| Number | Name | Date |
|---|---|---|
| 2,213,517 | Bienert et al. | Sept. 3, 1940 |

FOREIGN PATENTS

| Number | Country | Date |
|---|---|---|
| 205,538 | Switzerland | Dec. 16, 1939 |
| 742,392 | Germany | Dec. 14, 1943 |
| 569,200 | Great Britain | May 11, 1945 |